Nov. 2, 1948.　　　　E. H. LAND ET AL　　　　2,453,075
STEREOCAMERA RANGE FINDER SYSTEM

Filed Nov. 9, 1945　　　　　　　　　　　　　　4 Sheets-Sheet 1

INVENTORS
Edwin H. Land
Albert J. Bachelder
Otto E. Wolff
BY Watson, Bristol, Johnson & Leavenworth
ATTORNEYS Nov. 2, 1948.   E. H. LAND ET AL   2,453,075
STEREOCAMERA RANGE FINDER SYSTEM
Filed Nov. 9, 1945   4 Sheets-Sheet 2

INVENTORS
Edwin H. Land
Albert J. Bachelder
Otto E. Wolff
BY Watson, Bristol, Johnson y Leavenworth
ATTORNEYS Nov. 2, 1948.  E. H. LAND ET AL  2,453,075
STEREOCAMERA RANGE FINDER SYSTEM
Filed Nov. 9, 1945  4 Sheets-Sheet 3

INVENTORS
Edwin H. Land
Albert J. Bachelder
Otto E. Wolff
BY Watson, Bristol, Johnson & Leavenworth
ATTORNEYS Patented Nov. 2, 1948

2,453,075

UNITED STATES PATENT OFFICE 2,453,075

STEREO CAMERA RANGE FINDER SYSTEM

Edwin H. Land, Cambridge, Albert J. Bachelder, Lexington, and Otto E. Wolff, Cambridge, Mass., assignors to Polaroid Corporation, Cambridge, Mass., a corporation of Delaware Application November 9, 1945, Serial No. 627,744

4 Claims. (Cl. 95—18)

The invention is concerned with stereoscopic apparatus, and particularly with an improved arrangement for adjusting the respective functional characteristics of the optical system simultaneously and compatibly one with another. A stereoscopic camera of the character embodying the principles of the invention involves the transmission and focusing on film apertures of images which correspond to viewing an object field from two points on a base line spaced by a fixed distance corresponding usually to the average human interocular distance of about 2½ inches. When a photograph is thus taken, there will be a plane in space which appears in register with film aperture areas in the plane of the film. Objects in front of or behind this plane will appear to be differentially displaced in the two film aperture areas.

In various stereo processes such as in the anaglyph process or the vectograph process or the polarized image projection system using two films, two cameras and two projectors, and likewise in the apparatus depicted herein employing a single camera with a single film, it is desirable for obtaining certain stereoscopic effects to predetermine the plane in the object field which will appear in register on the film aperture areas according to the nature of the objects to be photographed. Generally speaking, the plane in space which will appear in registry with the aperture areas will be that determined by the intersection of the optical axes of the lenses, assuming these axes are perpendicular to the plane of the film as is usually the case. For example, if the lens axes are parallel, the plane in registry lies at infinity and if the lens axes are inclined by 36 minutes and the lenses are separated by the normal interocular distance of 2½ inches, the plane in space appearing in registry is ten feet from the lenses. Stereoscopic cameras normally embody range finder means for determination and selection of the desired plane in the object field. Such a selection, however, requires not only adjustment of the range finder means but adjustment also of the convergence means and the lens focusing.

It has been proposed heretofore to determine the plane in the object field which will appear in register in various ways. The expedients employed, however, have been inadequate or have involved complicated constructions leading to mechanical difficulties and not altogether satisfactory functional responses.

The present invention is designed to accomplish the desired results in a simplified reliable manner, adapted to maintain the proper functional relations for all normal adjustments and conditions of use. In the more complete form, the invention enables not only simultaneous focusing and adjustment of the convergence but also has coupled therewith, in a simple novel manner, range finder means adapted to converge the range finder rays simultaneously with the rays which form the images on the film.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention, reference should be had to the following detailed description, taken in connection with the accompanying drawings, in which.

Figure 1:
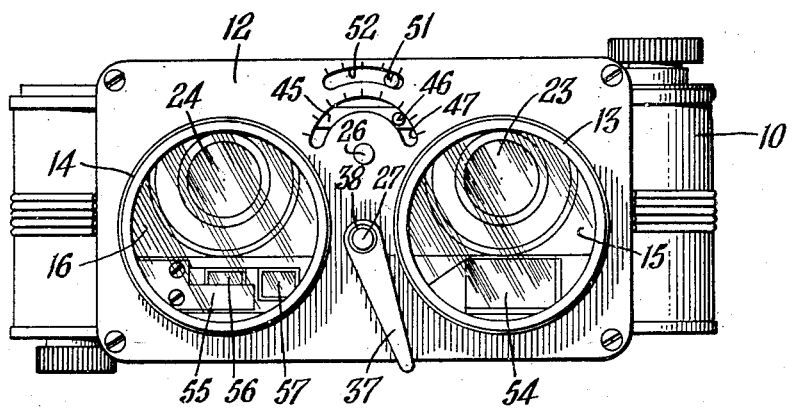
Fig. 1 is a front view of a camera embodying the invention.
Figure 2:
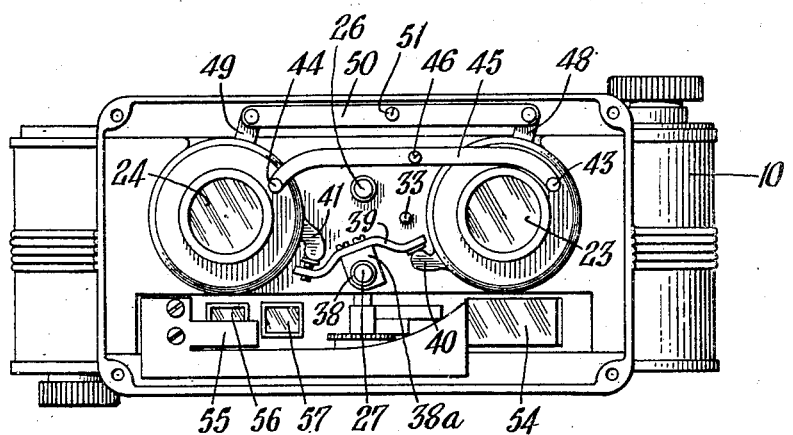
Fig. 2 is a view similar to Fig. 1, with the front plate removed.
Figure 3:
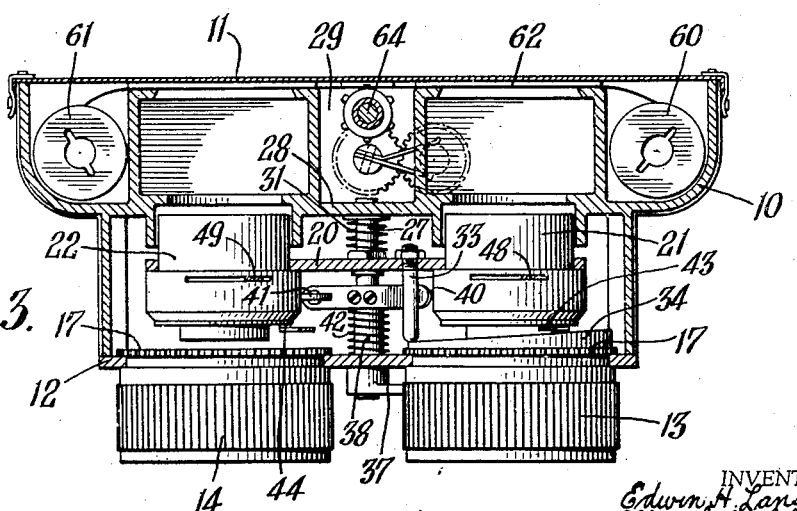
Fig. 3 is a plan view of the camera, with parts of the casing broken away and in section.
Figure 7:
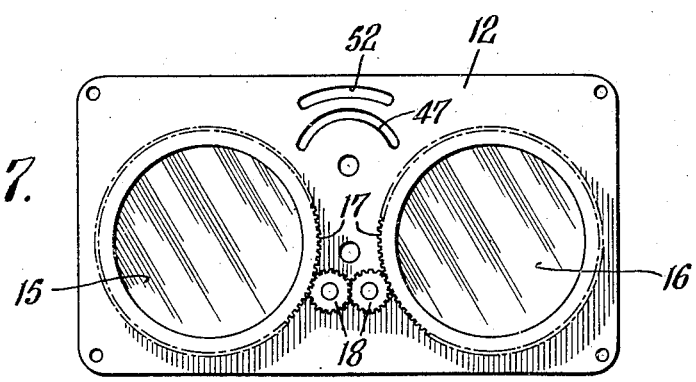
Fig. 7 is a back view of the front plate, showing the rotating means for the prism mounts.

The invention as specifically illustrated is embodied in a camera although it will be recognized that various principles and features are useful in projectors. The camera comprises a casing 10 having a quickly detachable rear plate 11 and a front plate 12 removably secured thereto by suitable screws. The front plate supports the optical system including a pair of prism mounts 13 and 14 rotatably secured in the front plate and symmetrically located with respect to the center thereof and having the centers of the respective prisms 15 and 16 spaced apart by the interocular distance employed. As shown in the form of Figs. 3 and 7 gear teeth 17 are provided on the periphery of the respective prism mounts and are connected together by a pair of idler gears 18 for effecting simultaneous rotation of the prism mounts in opposite directions upon the manual rotation of either. The prisms shown comprise optical wedges which are relatively thin but large in diameter (e. g. about two inches) to include in their ray transmitting field both the objective lens means and a range finder system, as will appear from the discussion to follow.

A lens board or frame 20 has a pair of housings 21 and 22 secured thereto, carrying matched objective lenses 23 and 24 respectively. Each objective lens may embody a single element or an aggregate of lens elements optically associated, and the term "objective lens" as herein employed is intended to have such general meaning. The optical axes of lenses 23 and 24 are parallel and spaced apart by the chosen interocular distance, and, as shown, are suitably located above the centers of the prisms 15 and 16. The lens board 20 is adapted to be moved toward or away from the film or back of the camera for simultaneously focusing the lenses 23 and 24. This focusing is made simultaneously with the rotary adjustment of the prisms 15 and 16 and in consonance with the adjustment of the plane of convergence, as will be described more in detail. The lens board 20 is rigidly mounted on posts 26 and 27 slidably carried at their forward ends by the front plate 12, and at their inner ends in openings in a front wall 28 of the film compartment 29 of the camera. Compression springs 30 and 31, encircling the posts 26 and 27 respectively, urge the lens board 20 toward the front plate 12. The position of the lens board is controlled by a cam and follower arrangement comprising a pin 33 adjustably fixed in the forward face of the lens board and adapted to have its forward end ride on the edge surface of an arcuate or circular cam 34 integral with or fixedly secured on the back of prism mount 13. If desired, a similar cam and pin arrangement may be provided in connection with the prism mount 14. The two posts 26 and 27 afford spaced supports for the lens board 20 and prevent rotation or lateral movement thereof.

Shutter and lens diaphragm means are provided, which may be of conventional types. As indicated somewhat generally in the form of Figs. 1 to 7, the shutter means are embodied in the respective lens housings 21 and 22 and are adapted to be actuated through the medium of a lever 37 (see Fig. 6) secured to a sleeve 38 provided with an enlarged annular rear portion 38a to which is fixed a double arm lever 39, the opposite ends being adapted to engage arms 40 and 41 connected to the shutter mechanism in the respective lens housings 21 and 22. A torsion spring 42, encircling sleeve 38, is connected to restore lever 37 when released.

The shutter timing controls 43 and 44 are linked together through a bar 45 which carries an adjusting and indicator element 46 extending forwardly through a slot 47 to the forward face of the front plate 12, a suitable scale giving shutter speeds being associated with the slot.

The lens diaphragm adjusting means are indicated generally at 48 and 49 and are linked together by a bar 50 having an indicator element 51 extending forwardly through slot 52 in the front plate 12 and adapted to move adjacent a scale on the front face, graduated in diaphragm openings.

It will be noted that the entire optical system thus far described, including the supports for the prisms and the lenses, are all mounted on and secured to the front plate 12 and are removable from the casing therewith as a unit. The proper alignment and relations are therefore easily accomplished and remain permanent.

Figure 4:
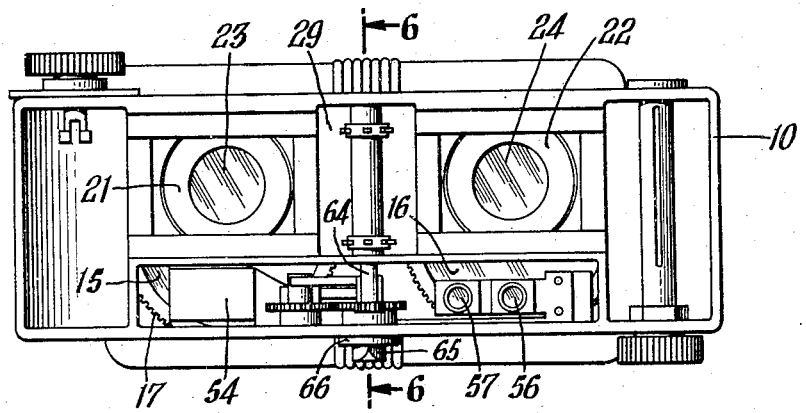
Fig. 4 is a rear view of the camera with the back plate removed.
Figure 5:
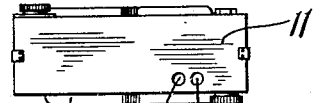
Fig. 5 is a rear view with the back plate attached.
Figure 6:
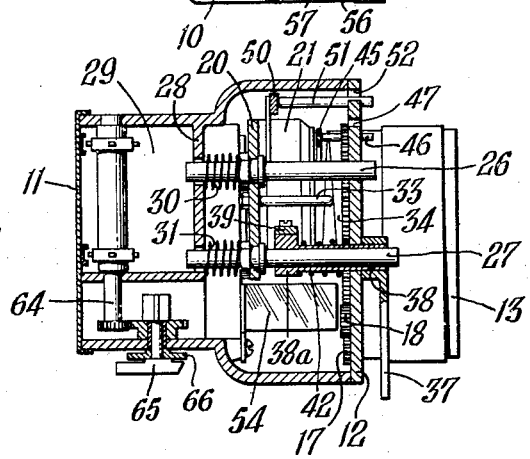
Fig. 6 is a vertical section on the line 6—6 of Fig. 4.

Suitable range finder means of the coincidence type are embodied in the camera and may be mounted, in general, on the front plate 12, or, as shown in Figs. 4 and 6 in particular, secured to the general main casing 10 adjacent the bottom thereof. The range finder includes the mirrors 54 and 55 fixedly positioned directly in back of prisms 15 and 16 respectively and inclined, as shown, to the axes of the lenses 21 and 22. Mirror 55 is one-half of the height of mirror 54. Light from the object striking the lower half of mirror 54 is reflected onto mirror 55 and directed into the eye-piece 56. Mirror 55 is opaque, as by full silvering, so that light direct from the object striking it is blocked, while light rays passing above the mirror 55 enter the eye-piece 56. Thus the eye-piece field is divided, one with the upper half of the right image of the object appearing in the upper half of the field, and the lower half of the left image of the object appearing in the lower half of the eye-piece field. The relation of the parts and the light ray paths may be more easily seen from the perspective showing in Fig. 8. It is important to note that the relation is such that rotation of the prisms 15 and 16 effects not only coincidence of the upper and lower images in the eye-piece field but also properly and correspondingly converges the left and right images transmitted through the objective lens and, furthermore, through the cam arrangement heretofore described, effects adjustment of the objective lens for proper focusing of the camera, as will be pointed out more clearly in connection particularly with Figs. 9 and 10.

A viewer as indicated by the eye-piece 57 may also be included in the general arrangement.

The camera is adapted to use conventional film, as e. g. 35 millimeter motion-picture film, which runs across between the spools 60 and 61, shown particularly in Fig. 3, the film being indicated at 62. As shown in Figs. 3 and 6, the film engages film sprockets fixed to a shaft 64 geared to a film counter mechanism of any suitable type, whereby to drive through gear mechanism a conventional film counter mechanism mounted in the rear of the camera case, including a pointer 65 which moves over a dial 66 having film exposure numbers thereon. In the arrangement shown, a given pair of stereoscopic images will be separated on the film by one space. For uniform advancement of the film, the arrangement of the images thereon will be as follows: Numbering the first frame as 1, the successive pairs of recorded images will appear on film frames 1 and 3, 4 and 6, 7 and 9, and so on. The intermediate frames between each image pair, i. e. frames 2, 5, 8, and so on, will remain blank. Various other arrangemnts of film feeding and positions of the images may be utilized by suitable modification.

Figure 11:
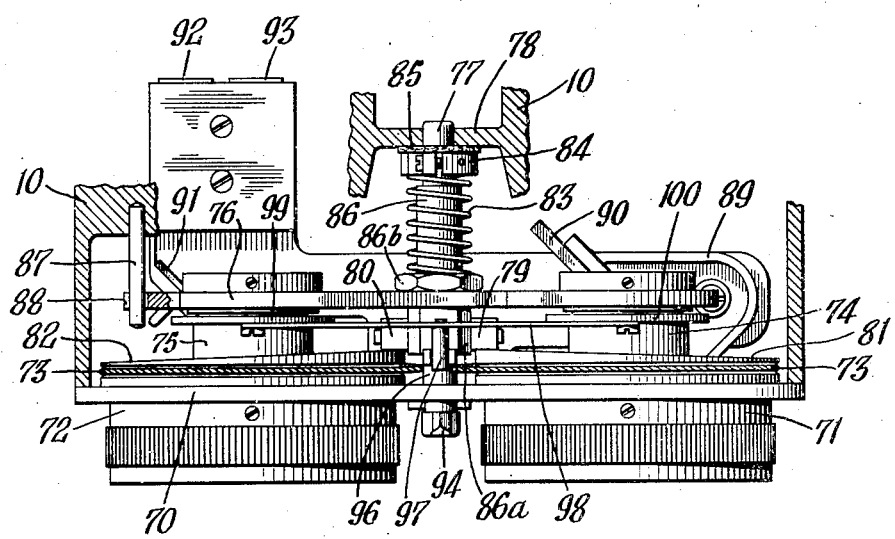
Fig. 11 is a plan view of a modified form of construction, with the casing largely broken away.
Figure 12:
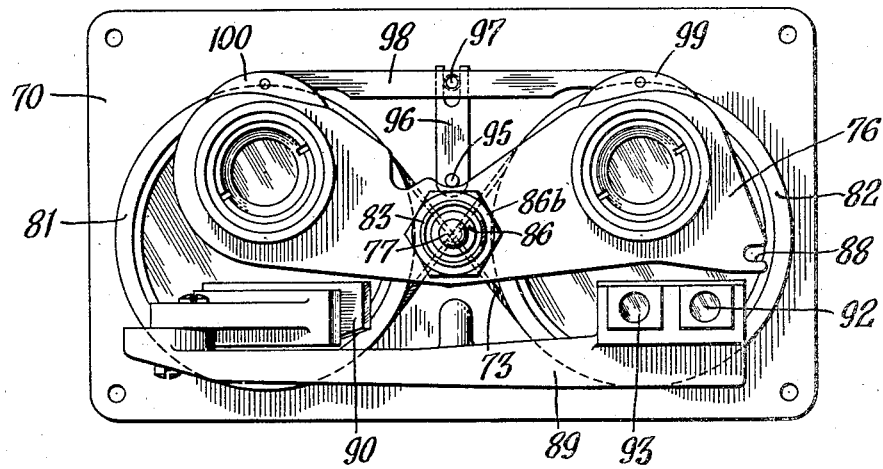
Fig. 12 is a rear view of the lens assembly of Fig. 11 removed from the casing.

A form of camera construction, modified in certain respects to be described, is shown in Figs. 11 and 12. In this modified form of construction, the prisms and respective objective lenses are carried on the front removable plate 70, similar in general to the form of Figs. 1 and 6. Simultanecus rotation of the prism mounts 71 and 72 is effected, however, by a cable 73, such as a piano wire, adapted to engage around grooves in the rear flanges of the respective prism mounts, the cables being crossed in the center, as shown in Fig. 12, whereby the prism mounts rotate in opposite directions. The lens chambers 74 and 75 are carried by a lens board or frame 76 slidably mounted on a post 77 fixed in the front plate 70 and the rear end thereof being insertable and supported in an opening in the wall 78 of the casing. The lens board 76 carries spaced fingers or cam followers 79 and 80 adapted to bear against the rear edge of circular or arcuate cams 81 and 82 formed on or secured to the rear portions of the prism mounts 71 and 72 respectively. The lens board 76 is urged forwardly by a spring 83 compressed between the lens board and an annular member 84 secured to the rear end of the pin 77. A felt washer 85 may be provided to prevent light escaping into the film compartment at the rear. To afford increased bearing length for the lens board on post 77, a sleeve 86 is employed having an enlarged forward head part 86a with a shoulder against which lens board 76 is clamped by a nut 86b threaded on the sleeve. The two cams and cam followers with the intermediate spring 83 provide a balanced actuating means for shifting the lens board. Rotation of the lens board assembly about post 77 is prevented by a pin 87 fixed in the main casing and adapted to project into a slot 88 at the edge of the lens board.

In the form of Figs. 11 and 12, the range finder and viewer are shown mounted on and removable with the front plate 70. The means in this respect include a bracket 89 secured to the bottom portion of the inner face of the front plate 70, the bracket carrying the full mirror 90 and the half mirror 91, corresponding respectively to the mirrors 54 and 55 shown e. g. in Fig. 2. The mirrors have associated therewith the eye-piece 92, likewise secured on the bracket 89. A viewer eye-piece is indicated at 93.

Diaphragm means of a suitable type may be embodied in the assembly of Fig. 12. Adjusting means therefor are shown, comprising a manually operable lever 94 movable over a scale on the front plate 70. The lever 94 is secured to a pin 95 extending through the plate 70 which has secured at the rear thereof an arm 96 having a slotted end to receive the pin 97 on the bar 98 which is connected at its opposite ends to the adjusting members 99 and 100 for the respective lenses. The diaphragm means per se may be of any conventional type, and details thereof form no part of the present invention.

Shutter mechanism will also be embodied in the camera, supported either on the front plate 70 or in the casing. The details thereof likewise form no part of the present invention, and are not specifically disclosed. A form of shutter mechanism well suited to the general combination forms the subject matter of an application of Albert J. Bachelder et al., for Shutter mechanism, Serial No. 627,745 filed November 9, 1945.

Figure 8:
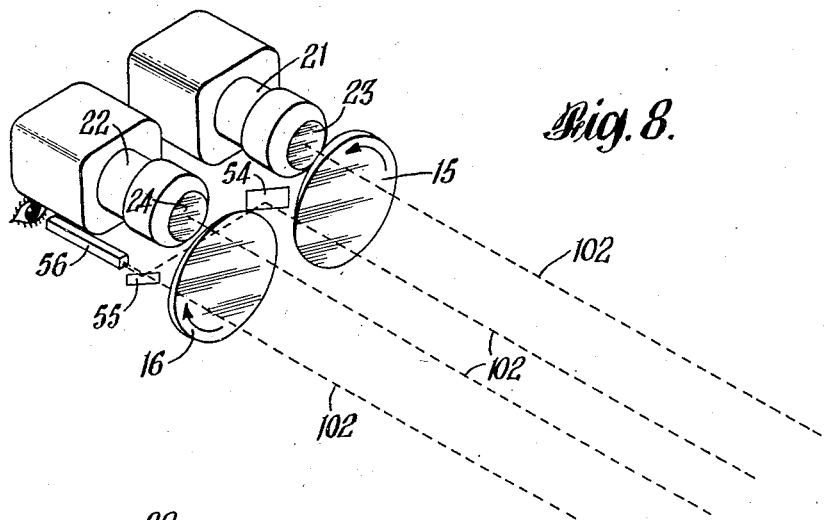
Fig. 8 is a schematic perspective view of the camera.
Figure 9:
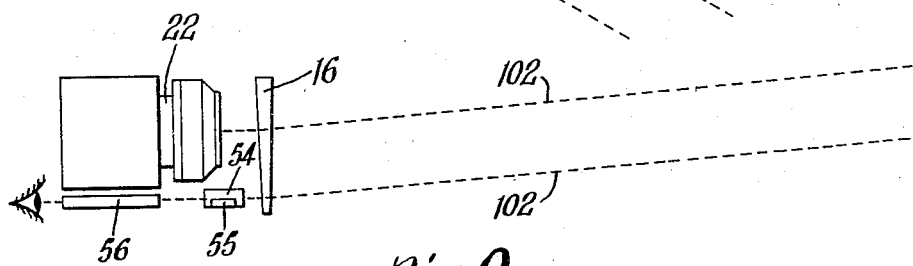
Fig. 9 is a schematic side view.
Figure 10:
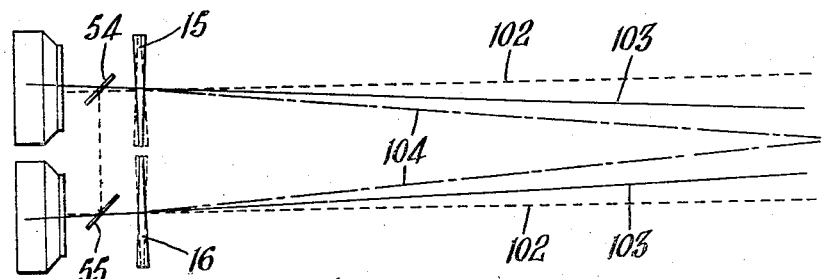
Fig. 10 is a schematic plan view of the camera, showing the convergence of light rays.

Figs. 8 to 10, and particularly Figs. 9 and 10, show schematically the light ray paths. The elements in these figures are designated by numerals corresponding to the form of mechanism shown in Figs. 1 to 7, but it will be understood that the general principles apply equally to the form shown in Figs. 11 and 12. The effect of prisms 15 and 16 on light rays proceeding from the object, when the device is employed as a camera, is shown in a vertical plane in Fig. 9 and in a horizontal plane in Fig. 10. These effects are alike for the lenses and the range finder means. Dash lines 102 show the light paths when the camera is focused and ranged on a far object (infinity), the paths being parallel, while the full lines 103 show the camera focused and ranged on a nearer object, and the broken lines 104 on a still nearer object, it being noted that lines 103 and 104 are converging.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described our invention, what we claim as new and desire to secure by Letters Patent is:

1. In a stereoscopic camera, a pair of laterally spaced similar ray deflecting and converging elements positioned in the forward part of said camera, objective lens means mounted rearwardly of said elements and optically associated therewith for the reception of stereoscopic images, said ray deflecting elements converging the axial rays traversing said lenses at a point in a forward plane, means for adjusting simultaneously and symmetrically said elements to vary the position in space of said plane of convergence, means for adjusting the focus of said lens means, range finder means including a reflector mounted rearwardly of each of said elements and adapted to receive rays from the respective said element corresponding to the convergence adjustment of said elements, and an operative connection between said two adjusting means whereby adjustment of one effects a consonant adjustment of the other for focusing in the image field of the respective images as determinable from said range finder means.

2. A stereoscopic camera having in combination, a pair of objective lenses having their axes parallel and spaced apart a predetermined distance in a horizontal plane, a relatively thin prismatic wedge mounted in front of each of said lenses, each being rotatable on an axis parallel to the axes of said lenses and similarly spaced and in symmetrical relation to said lenses, the optical axes of said objective lenses being adapted to be effectively converged by said prisms at a forward plane, range finder means including elements spaced in a horizontal plane each adapted to receive rays from one of said prisms, said latter plane being vertically spaced from said lenses and said prisms having a relatively large area to provide rays for said lenses and said range finder elements, and means for simultaneously rotating said prisms to simultaneously and similarly vary the effective convergence of the optical axes of said lenses and said range finder elements.

3. A stereoscopic camera having in combination, a pair of objective lenses having their axes substantially parallel and spaced apart a predetermined distance in a horizontal plane, a relatively thin prismatic wedge mounted in front of each of said lenses and each being rotatable around an axis parallel to and in symmetrical relation to the axes of said objective lenses, said prisms being capable of effectively converging the optical axes of said objective lenses at a forward plane, range finder elements including a reflector fixedly mounted behind one of said prisms and an eyepiece behind the other of said prisms, said elements being vertically spaced from said lenses and each of said prisms having a relatively large area to provide rays for one of said lenses and one of said range finder elements, and means for simultaneously rotating said prisms to simultaneously and similarly vary the effective convergence of the optical axes of said lenses and said range finder elements.

4. In a stereoscopic camera, a pair of laterally spaced similar ray-deflecting and converging elements positioned in the forward part of said camera, a pair of spaced objective lens means mounted rearwardly of said element and optically associated therewith for the reception of stereoscopic images, said ray-deflecting elements converging the axial rays traversing said lenses at a point in a forward plane, a common mounting frame for said lenses, means for slidably supporting said frame to enable forward or rearward adjustment of said lenses to vary the foci thereof, means for adjusting simultaneously and symmetrically said elements to vary the position in space of said plane of convergence, range finder means including a reflector mounted rearwardly of each of said elements and adapted to receive rays from the respective said element corresponding to the convergence adjustment of said elements, a cam movable with said adjusting means, an operative connection between said lens frame and said cam whereby movement of the latter causes slidable adjustment of said frame whereby adjustment of said elements effects a consonant adjustment of said lenses for focusing them on said plane of convergence as determinable from said range finder means.

EDWIN H. LAND.
ALBERT J. BACHELDER.
OTTO E. WOLFF.

REFERENCES CITED

The following references are of record in the file of this patent:

UNITED STATES PATENTS

| Number | Name | Date |
|---|---|---|
| 2,003,754 | Miller | June 4, 1935 |
| 2,165,402 | Mihalyi | July 11, 1939 |
| 2,168,273 | Sauer et al. | Aug. 1, 1939 |
| 2,298,586 | Phillips | Oct. 13, 1942 |